US006982801B1

(12) United States Patent
Saito

(10) Patent No.: US 6,982,801 B1
(45) Date of Patent: Jan. 3, 2006

(54) INTERNET FACSIMILE APPARATUS AND E-MAIL RECEIVING METHOD

(75) Inventor: Kyoji Saito, Kawasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 848 days.

(21) Appl. No.: 09/611,365

(22) Filed: Jul. 6, 2000

(30) Foreign Application Priority Data

Dec. 27, 1999 (JP) ................................. 11-368837

(51) Int. Cl.
G06F 15/00 (2006.01)
(52) U.S. Cl. .................... 358/1.15; 358/402; 358/406
(58) Field of Classification Search ............... 358/1.11, 358/1.12, 1.13, 1.14, 1.15, 1.16, 400, 402, 358/406, 1.2
See application file for complete search history.

(56) References Cited

U.S. PATENT DOCUMENTS

| 5,812,278 | A |   | 9/1998  | Toyoda et al.              |
|-----------|---|---|---------|----------------------------|
| 5,819,011 | A | * | 10/1998 | Fitzpatrick et al. 358/1.11 |
| 5,859,967 | A |   | 1/1999  | Kaufeld et al.             |
| 5,881,233 | A |   | 3/1999  | Toyoda et al.              |
| 5,915,024 | A | * | 6/1999  | Kitaori et al. ....... 713/176 |
| 6,094,277 | A |   | 7/2000  | Toyoda                     |
| 6,618,749 | B1 |  | 9/2003  | Saito et al.               |

FOREIGN PATENT DOCUMENTS

| EP | 893897    | 1/1999  |
|----|-----------|---------|
| JP | 7-73167   | 3/1995  |
| JP | 8-242326  | 9/1996  |
| JP | 9-116728  | 5/1997  |
| JP | 10307769  | 11/1998 |
| JP | 10334007  | 12/1998 |
| JP | 11-15755  | 1/1999  |

OTHER PUBLICATIONS

English Language Abstract of JP 8-242326.
English Language Abstract of JP 9-116728.
Patent Abstract of Japan, vol. 1999, No. 02, Feb. 26, 1999.
English Language Abstract of JP-10-334007.
English Language Abstract of JP-11-15755.
English Language Abstract of JP-7-73167.

* cited by examiner

Primary Examiner—Mark Wallerson
(74) Attorney, Agent, or Firm—Greenblum & Bernstein, P.L.C.

(57) ABSTRACT

A blank determining section performs scanning of a text part of e-mail when receiving e-mail. The scanning of text part is carried out up to a next boundary. After the end of scanning, the blank determining section determines whether or not there is any code other than unprintable codes such as a blank, a tab, a line feed, and the like. Since the text part is composed of only a line feed, the blank determining section clears data of the text part from a mail reception memory area. An image part is normally printed. As a result, the printing of text part is skipped, and only the image part is printed. This makes it possible to prevent a useless output and an output of inconvenient information.

10 Claims, 9 Drawing Sheets

INTERNET FACSIMILE APPARATUS AND E-MAIL RECEIVING METHOD

BACKGROUND OF THE INVENTION

1. Field of the Invention

The present invention relates to an Internet facsimile apparatus that receives and transmits image information over a computer network using e-mail, and relates to an e-mail receiving method.

2. Description of the Related Art

Recently, an Internet facsimile apparatus (hereinafter referred to as IFAX) that receives and transmits data over the Internet using e-mail as disclosed in Unexamined Japanese Patent Publication HEI No. 8-242326 and its corresponding U.S. Pat. No. 5,881,233, has come into practical use.

When IFAX, which has a printer built-in or connected thereto, receives e-mail, IFAX automatically prints text included in e-mail and the content of an image file appended to e-mail using the printer.

In the conventional IFAX checks whether or not e-mail is in a multipart format according to MIME (Multipurpose Internet Mail Extension) when receiving e-mail. Here, if the multipart format is used, IFAX checks whether or not there are a text part and an attachment file part, and prints the content of each part, which have been found with this checking, using the printer.

In a case where only an attachment file is added without describing anything in the text part, a certain mailer adds a line feed code to the text part, generates a multipart mail, which is composed of a blank text part and an attachment file part, and transmits it. When the conventional IFAX receives e-mail from such a mailer, IFAX performs printing without checking the content if there is the text part, with the result that a blank page corresponding to the text part is printed.

Moreover, a certain mailer inserts a text, which is preregistered as a signature, into a text part automatically. In a case where only an attachment file is added without describing anything in the text part, this mailer generates a multipart mail, which is composed of a text part, which includes only a signature, and an attachment file part, and transmits it. If the conventional IFAX receives e-mail from such a mailer, IFAX prints a meaningless page, which includes only the signature corresponding to the text part.

Thus, the conventional IFAX has a problem in which a waste of power and an increase in printing time are caused.

While, there is proposed a technique in which a specific command is embedded in a text part of e-mail and this specific command is recognized by IFAX on the receiving side to carry out processing, which corresponds to the command, as disclosed in Unexamined Japanese Patent Publication HEI No. 9-116728 and its corresponding U.S. Pat. No. 5,812,278. In this case, if the conventional IAX prints the text part, the command is also printed.

Moreover, at the time of sending e-mail having the same content to a plurality of IFAXes, there is a case in which a user wishes to include a serial number for management or a message such as "importance" in the mail in order to manage e-mail transmitted. In this case, if the conventional IAX prints the text part, information for sender management is also printed.

SUMMARY OF THE INVENTION

The present invention has been made in consideration of the above-mentioned problems, and an object of the present invention is to provide an Internet facsimile apparatus, which is capable of preventing a useless output and an output of inconvenient information, and to provide an e-mail receiving method.

In order to achieve the above object, not only the presence or absence of a text part but also the content of the text part is analyzed, and whether or not the output of the text part is performed is determined based on the analytical result. This makes it possible to prevent a useless output without outputting the text part in a case where no content to be output is included in the text part.

The present invention removes a character string inserted between a pair of predetermined codes, and outputs a text part. This makes it possible to prevent an output of unnecessary or inconvenient content, which is caused when a sender inserts a character string such as a command and information for sender management between the pair of predetermined codes.

In this case, the output includes the printing of received data when IFAX on the receiver side comprises a printer, facsimile transmission of received data when IFAX comprises a facsimile transmission function, and the display of received data when IFAX comprises a display device.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

The following will specifically explain embodiments of the present invention with reference to the drawings attached thereto.

First Embodiment

Figure 1:
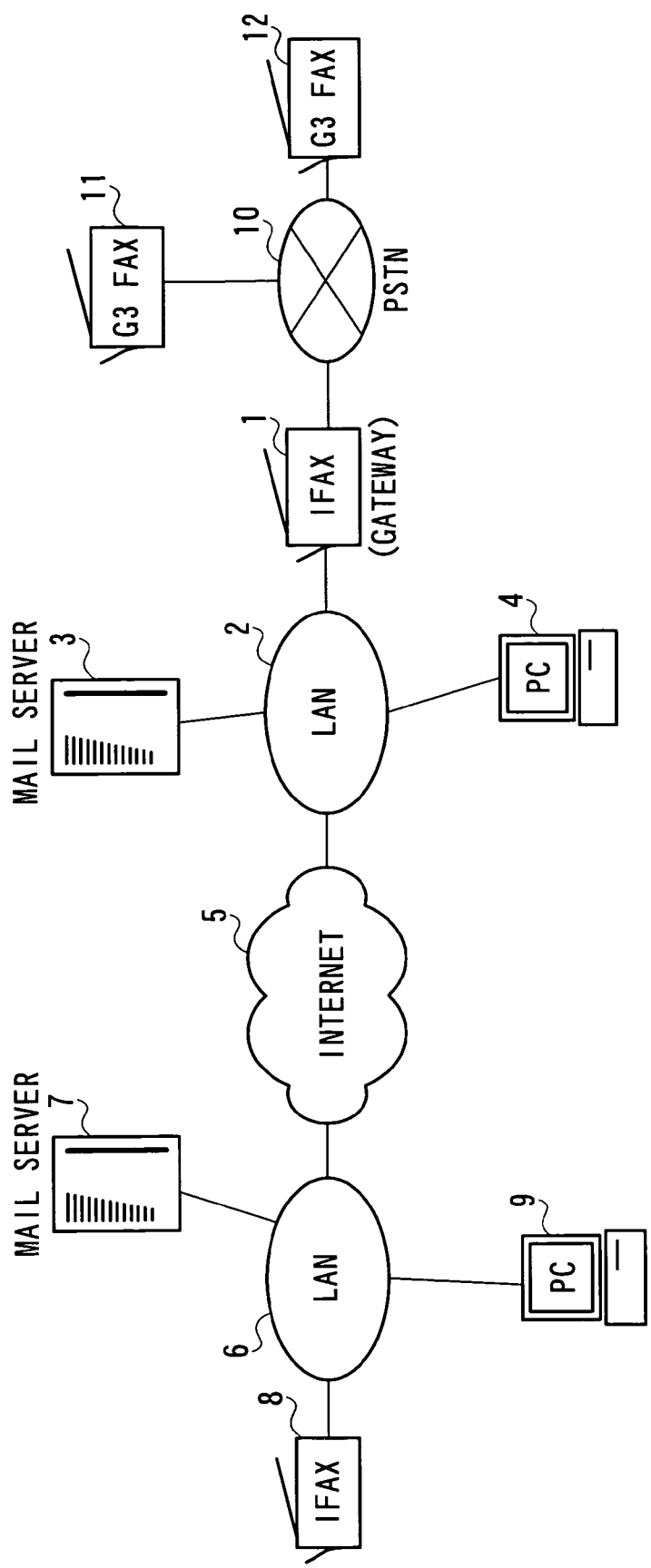
FIG. 1 is a conceptual view showing a network where IFAX according to a first embodiment of the present invention operates.

FIG. 1 is a conceptual view showing a network where IFAX according to a first embodiment of the present invention operates.

IFAX 1 according to the first embodiment is connected to a local area network (LAN) 2. A mail server 3 and PC 4 are connected to LAN 2.

LAN 2 is connected to Internet 5, and other LAN 6 is connected to Internet 5. A mail server 7, IFAX 8 and PC 9 are connected to LAN 6. This configuration allows IFAX 1 to receive image information using e-mail from IFAX 8 or PC 9 over Internet 5.

Moreover, IFAX 1 can function as a gateway between Internet 5 and PSTN 10. Namely, IFAX 1 converts e-mail data received from IFAX 8 or PC 9, which serves as a sender, to facsimile data and transmits it to G3FAXes 11 and 12. However, IFAX 1 cannot necessarily operate as a gateway.

On the other hand, IFAX 1 is connected to public switched telephone network (PSTN) 8, and this makes it possible to transmit image information to G3FAXes 11 and 12 by a facsimile procedure.

Figure 2:
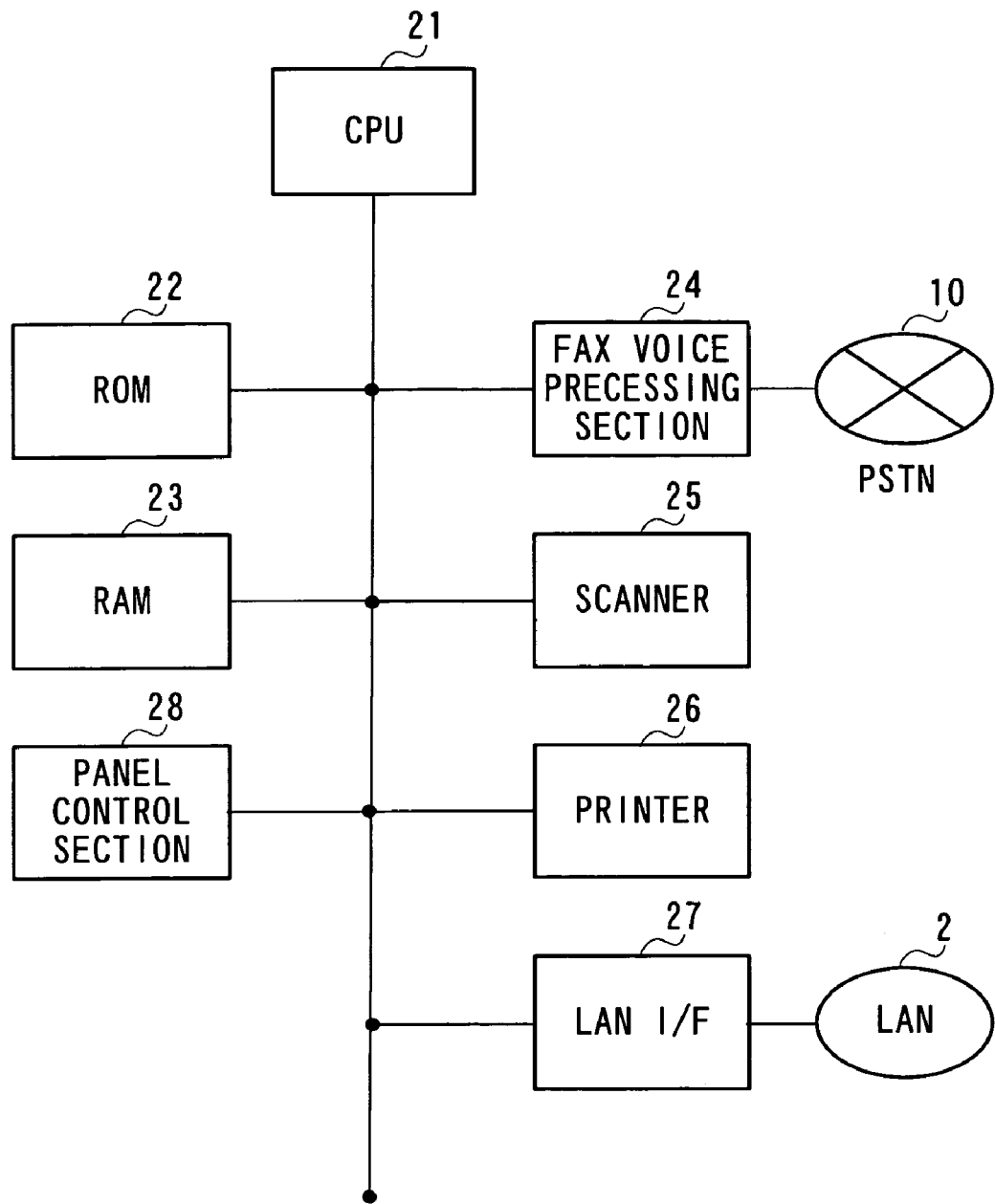
FIG. 2 is a block diagram showing hardware of IFAX according to the first embodiment.

FIG. 2 is a block diagram showing hardware of IFAX according to the first embodiment. CPU 21 executes a program, and controls the entirety of the apparatus. ROM 22 stores the program, which CPU 21 executes.

RAM 23 has a work area where the program is executed and a buffer area where various data such as e-mail, image file, etc., is temporarily stored.

A FAX voice processing section 24 modulates facsimile data and a voice, and outputs modulated data to PSTN 10. Then, the FAX voice processing section 24 demodulates modulated data received from PSTN 10 to facsimile data and voice data.

A scanner 25 scans an original to obtain image information. A printer 26 prints various data including received image information.

A LAN interface 27 executes a procedure, which is necessary for receiving and transmitting data over LAN 2.

A panel control section 28 comprises dial keys and a touch panel, and receives operations such as a designation of a communication partner, an instruction of transmission starting, and the like by an operator.

Figure 3:
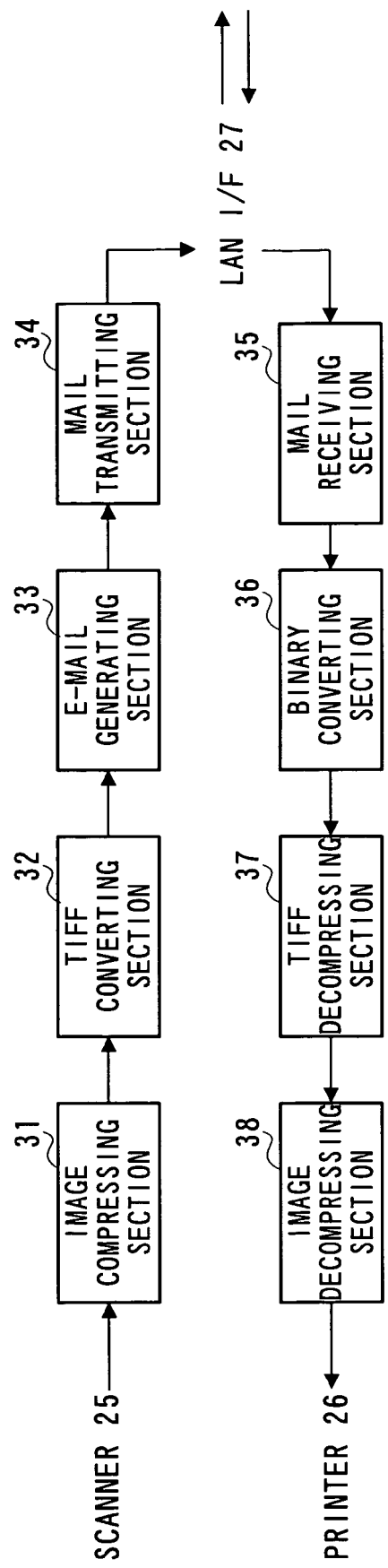
FIG. 3 is a block diagram showing a basic function of IFAX according to the first embodiment.

FIG. 3 is a block diagram showing a basic function of IFAX according to the first embodiment.

This IFAX transmits and receives e-mail using LAN interface 27 via a computer network such as LAN 2 and the like. More specifically, an image compressing section 31 compresses raw image information (for example, bitmap data), which has been scanned by the scanner 25, in a compression format, for example, MH, so as to obtain a compressed file. The compression is performed in unit of one page of the original. Next, a TIFF converting section 32 converts these compressed files to one TIFF (Tag Image File Format) file. An e-mail generating section 33 attaches this TIFF file to a multipart mail in accordance with, for example, MIME (Multipurpose Internet Mail Extension). By processing so far, image information is converted to e-mail format. A mail transmitting section 34 transmits this e-mail via LAN interface 27 using a mail transfer protocol such as SMTP and the like.

On the other hand, a mail receiving section 35 receives e-mail via the LAN interface 27 using a mail transfer protocol such as SMTP, POP (Post Office Protocol), etc. This e-mail is a multipart mail, and the TIFF file is converted to character data, that is, text code, and appended to an attachment file part. A binary converting section 36 binary converts the text code of the image data part (attachment file part) of the multipart mail so as to obtain the TIFF file. The binary conversion is that text-code data is converted to binary data. Namely, data, which is text-coded using base 64, is binarized to be back to the original image data.

A TIFF decompressing section 37 opens this TIFF file. An image decompressing section 38 decompresses a compressed file included in this TIFF file to obtain row image information. By processing so far, e-mail is converted to an image information format.

Figure 4:
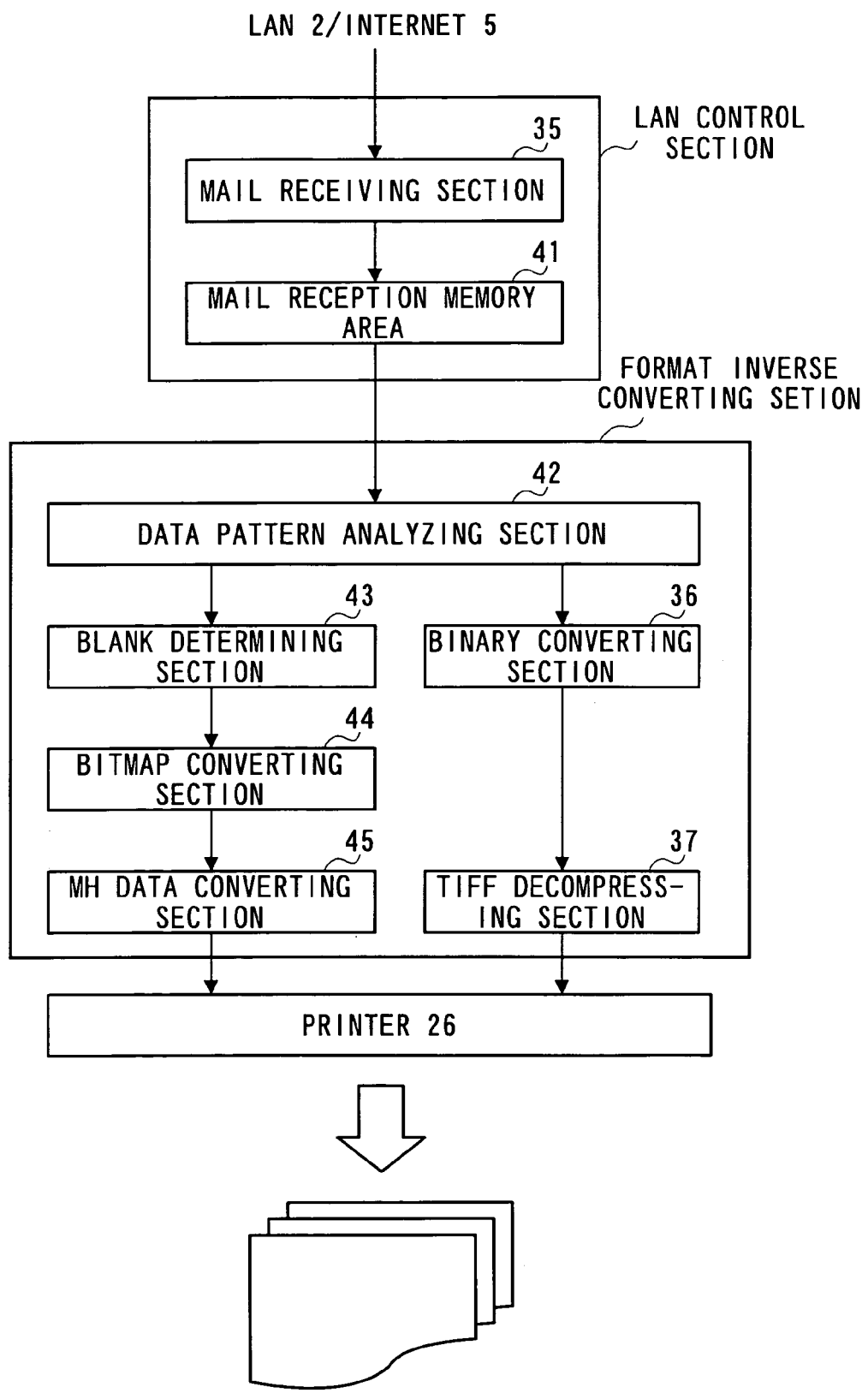
FIG. 4 is a block diagram showing a function of receiving e-mail in IFAX according to the first embodiment.

Next, the reception of e-mail and the printing in the above-mentioned IFAX 1 will be specifically explained. FIG. 4 is a block diagram showing a function of receiving e-mail in IFAX according to the first embodiment.

E-mail data received via LAN 2 or Internet 5 is once stored to a mail reception memory area 41 of RAM 23. A data pattern analyzing section 42 analyzes e-mail data stored in the mail reception memory area 41. The data pattern analyzing section 42 distinguishes the text part and the image data part from the e-mail data based on a subheader of e-mail data respectively.

Regarding the text part, a blank determining section 43 determines whether or not the text part is blank. If it is not the blank part, a bitmap converting section 44 converts text data (code signal) included in the text part to binary data (bitmap data). Sequentially, an MH data converting section 45 compresses binary data to MH data. This MH data is sent to the printer 26 and stored in the memory of the printer 26.

Moreover, if the text part is the blank, text part data stored in the memory reception memory area 41 is erased.

While, regarding the image data part, as mentioned above, the binary converting section 36 binary converts the text code of the image data part to obtain the TIFF file. The TIFF decompressing section 37 opens this TIFF file to extract MH data. This MH data is sent to the printer 26, and stored in the printer 26.

In the aforementioned first embodiment, since the printer 26 performs decompression of MH data received by the facsimile procedure and the printing, and the printer 26 also serves as a printer for FAX.

Here, the point that the text part is blank means that the text part is composed of only unprintable codes instead of the fact that the text part is included in the e-mail. The unprintable codes indicate those other than printable codes such as a character, a symbol, a numeric, and the like, and they do not appear even if the printing is performed in the text code, which is used in e-mail. Specifically, a blank, a tab, a line feed, and the like are included.

Figure 5:
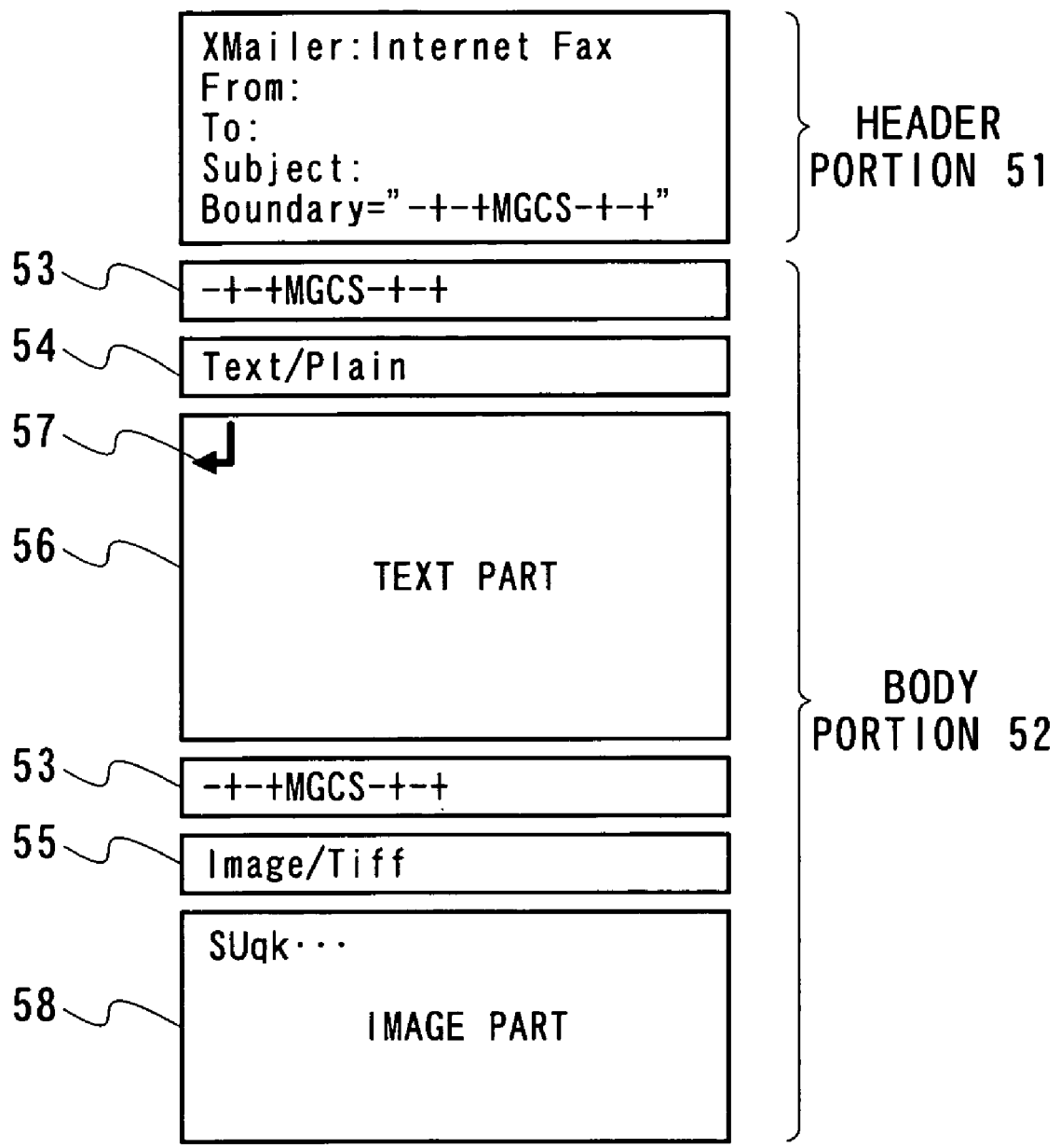
FIG. 5 is a view showing one example of e-mail with image data in which a text part is blank.

FIG. 5 is a view showing one example of e-mail with image data in which a text part is blank.

This e-mail can be largely divided into a header portion 51 and a body portion 52. The body portion 52 is divided into a plurality of parts by boundaries 53, which are defined by the header portion 51. A subheader 55 is described at the first portion of each part to indicate the content of each part. In this example, a subheader 54 of the first part (hereinafter referred to as text part) indicates text data, and a subheader 55 of the second part indicates image data. The body of the text part of this e-mail is composed of only a feed line code 57. Next, an explanation will be given of each step of e-mail data print processing in IFAX according to the first embodiment. The following specifically exemplifies a case of processing E-mail shown in FIG. 5.

Figure 6:
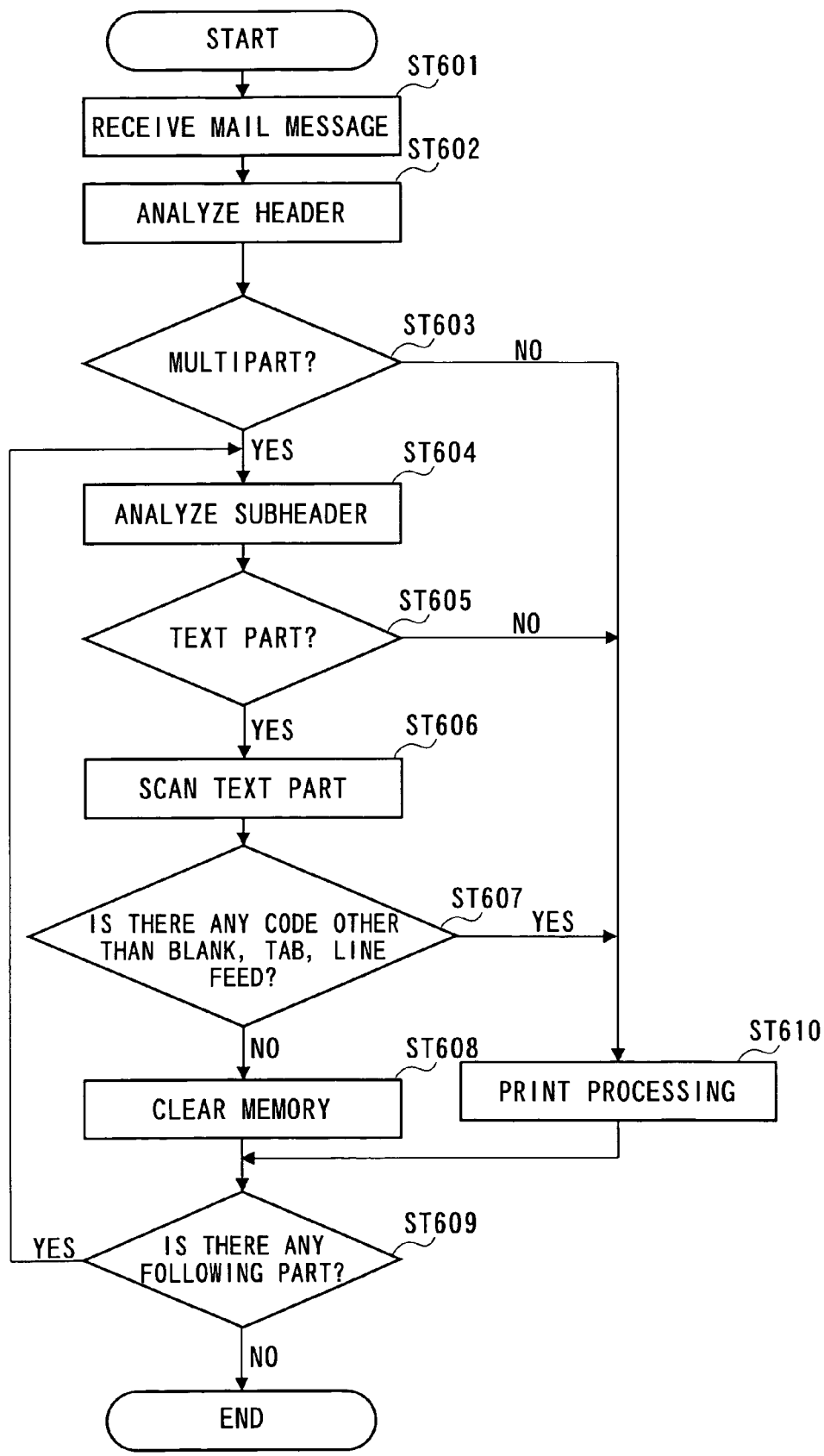
FIG. 6 is a flowchart showing print processing of e-mail data in IFAX according to the first embodiment.

FIG. 6 is a flowchart showing print processing of e-mail data in IFAX according to the first embodiment.

When IFAX 1 receives e-mail (step (hereinafter referred to as ST) 601), the data pattern analyzing section 42 analyzes the header portion 51 (ST602) to determine whether or not received e-mail is a multipart structure (ST603).

Here, if e-mail is the multipart structure, the data pattern analyzing section 42 analyzes the subheader 54 of the first part (ST604). Then, the data pattern analyzing section 42 determines whether or the first part is a text part based on the analytical result (ST605). In e-mail shown in FIG. 5, since the first part is text part 56, the operation goes to ST606 and a blank determining section 43 performs the scanning of text part. The scanning of text part 56 is performed up to the next boundary.

After scanning, the blank determining section 43 determines whether or not the text part 56 includes codes other than unprintable codes such as the blank, tab, line feed, and the like (ST607). In e-mail shown in FIG. 5, since the text part 56 is composed of only a line feed code 57, the blank determining section 43 clears data of text part 56 from the mail reception memory area 41.

Thereafter, the data pattern analyzing section 42 determines whether or not there is a part following the currently analyzed part (ST609). In this example, since there is an image part 58 following the text part 56, the operation goes back to ST604. The data pattern analyzing section 42 analyzes the subheader 55 of image part 58 to determine whether or not it is the text part (ST605). Since this part is the image part 58, the image part 58 is normally printed in ST610.

Thereafter, since e-mail shown in FIG. 5 has no part that follows the image part 58 in ST609, the operation is ended. As a result, the printing of text part 56 is skipped, and only image part 58 is printed.

If e-mail is not the multipart structure in ST603, e-mail is normally printed in ST610. Moreover, in ST607, if the text part 56 includes codes other than unprintable codes, the print processing is performed in ST610, and the text part is also printed.

As explained above, according to IFAX 1 relating to the first embodiment, the content of text part 56 of received e-mail is analyzed. Then, if the text part 56 is composed of only the unprintable code such as a blank, tap, line feed and the like, the printing of text part 56 is skipped. Since this eliminates the need for performing unnecessary printing, waist of recording paper can be eliminated and printing time and consumption power for printing can be reduced.

Second Embodiment

Next, an explanation will be given of IFAX of the second embodiment of the present invention, which does not print the code inserted between the specific codes in the text part of e-mail.

Figure 7:
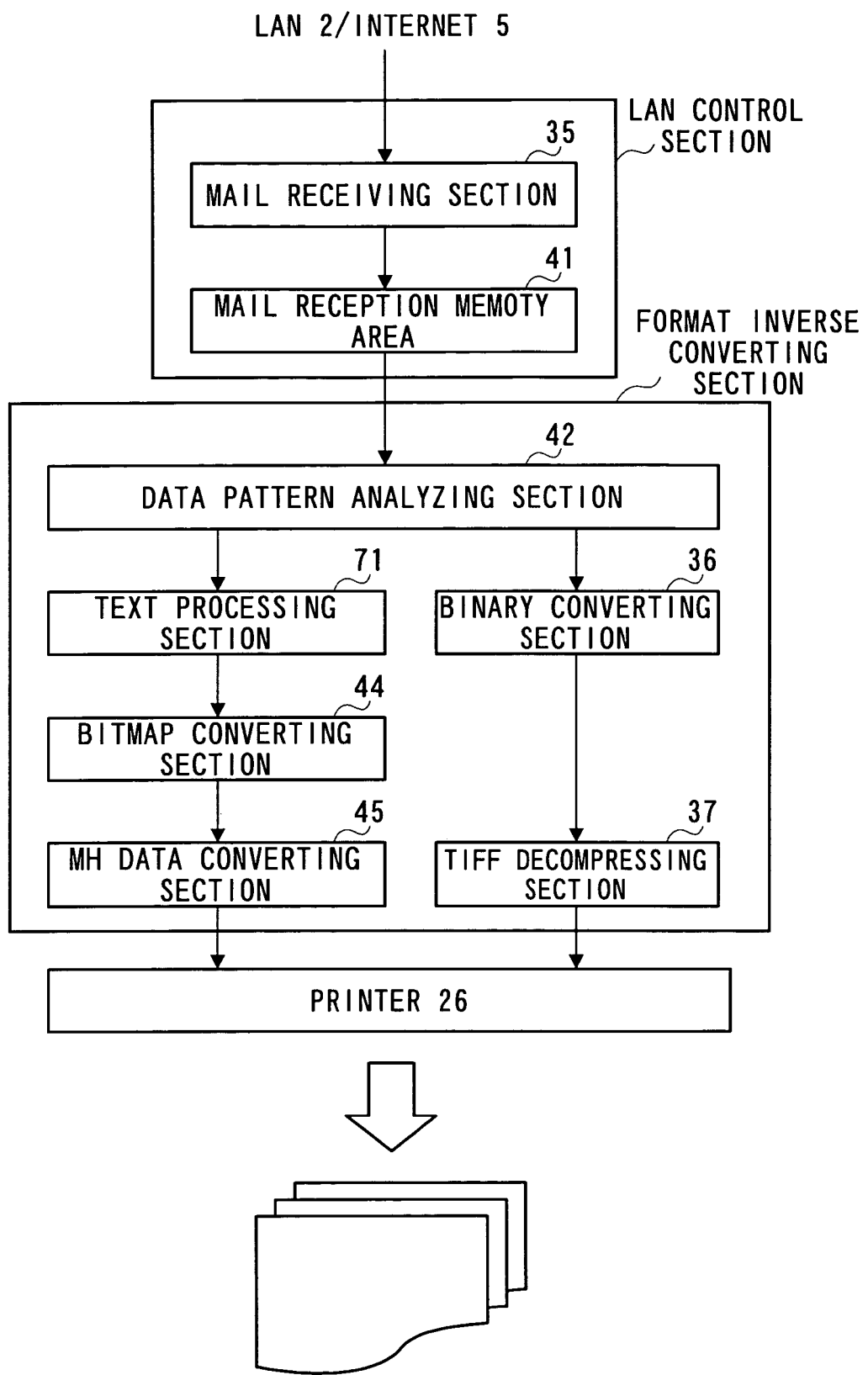
FIG. 7 is a block diagram showing a function of receiving e-mail in IFAX according to a second embodiment.

FIG. 7 is a block diagram showing a function of receiving e-mail in IFAX according to a second embodiment. The same reference numerals as those of IFX 1 of the first embodiment are added to the same configurations as those of IFAX 1 of the first embodiment, and the explanation is omitted.

IFAX of the second embodiment differs from that of the first embodiment in the point that a text processing section 71 is provided in place of the blank determining section 43 of FIG. 4. If there is a code, which is inserted between a pair of specific codes, in the text part, this text processing section 71 performs text processing in which, for example, these codes are replaced with unprintable codes such as a blank code. Thus, the text processing can contain text editing, text manipulation, text revision, text synthesis or the likes.

Figure 8:
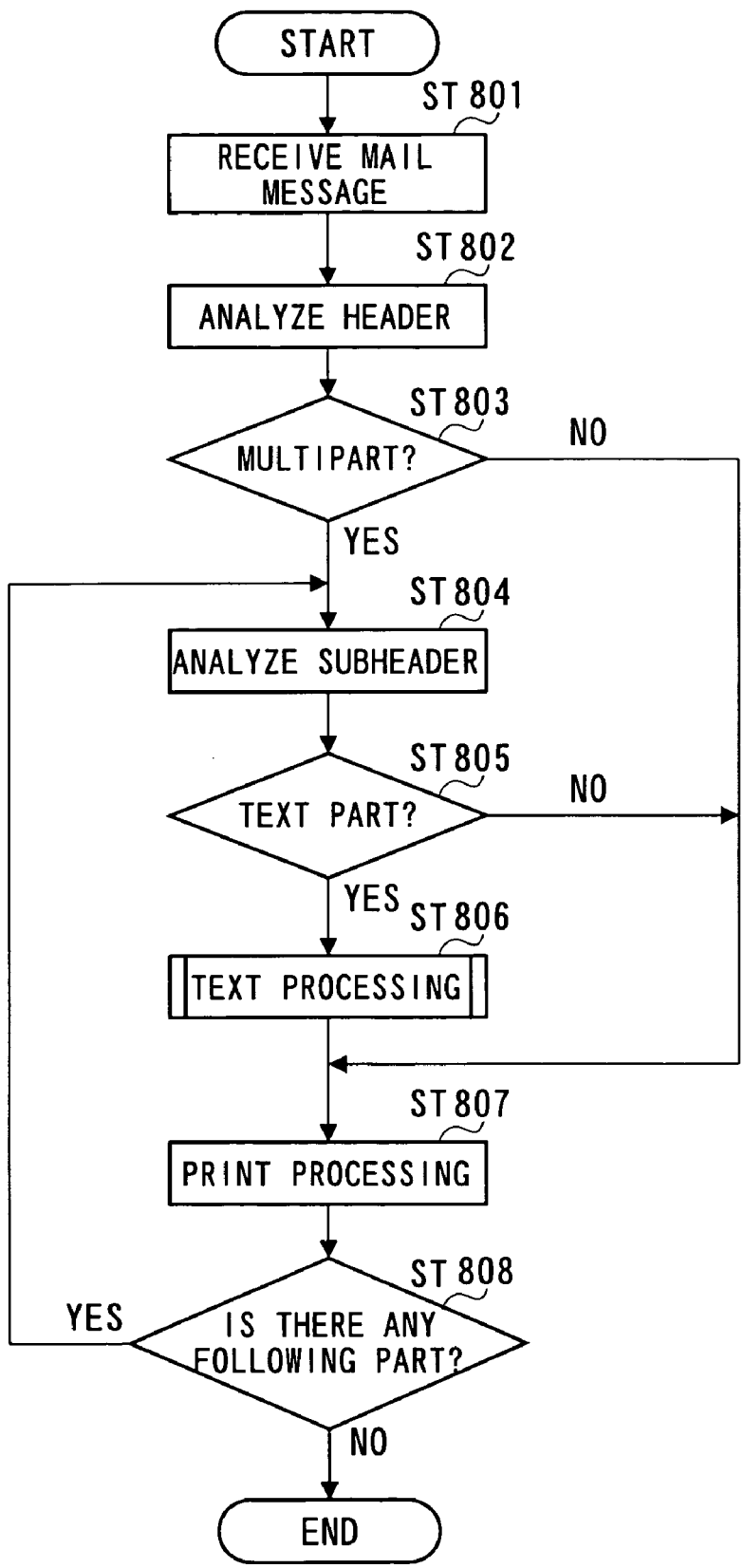
FIG. 8 is a flowchart showing print processing of e-mail data in IFAX according to the second embodiment.
Figure 9:
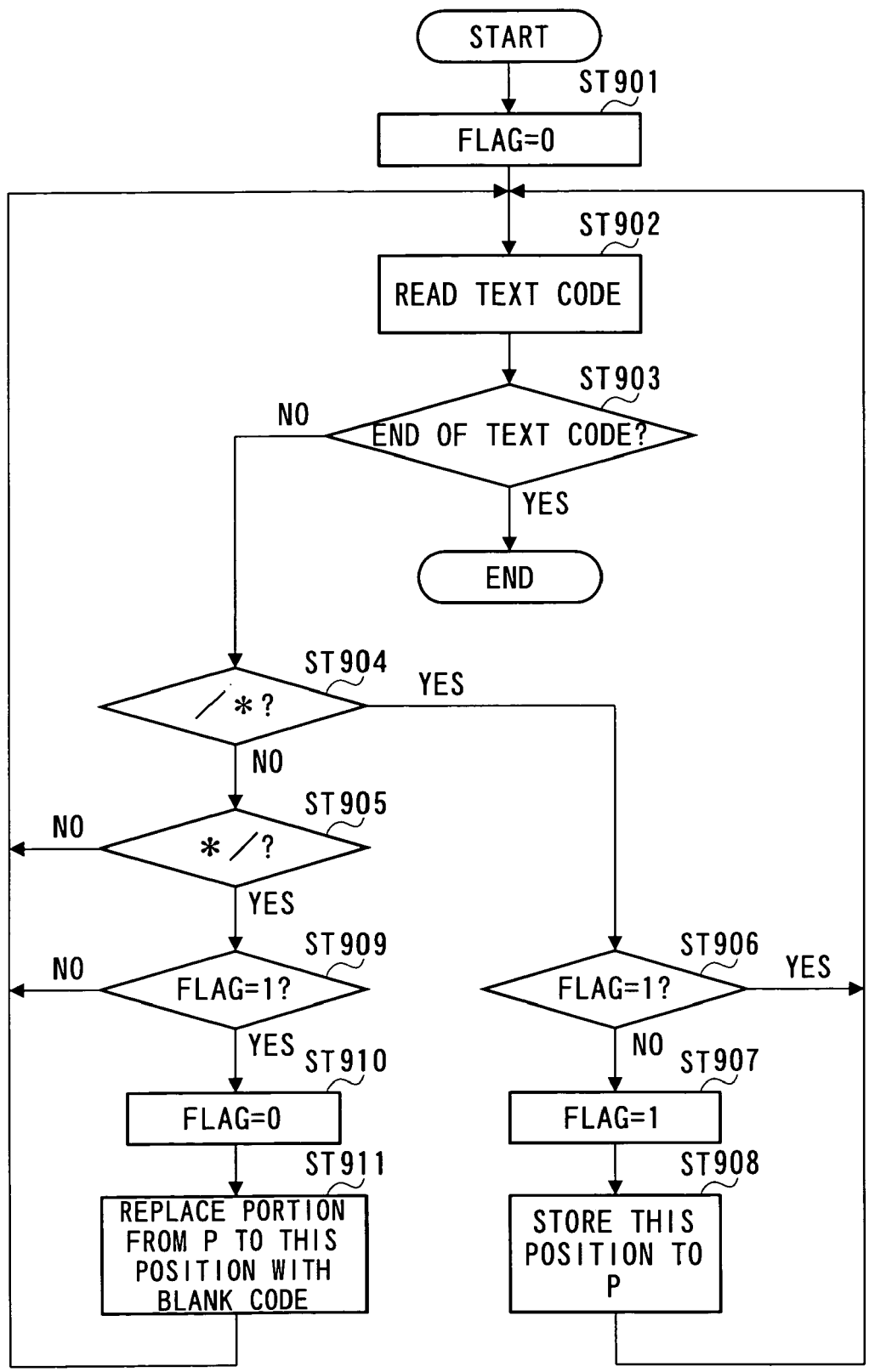
FIG. 9 is a flowchart showing text processing in IFAX according to the second embodiment.

The following will explain the print processing of e-mail data in IFAX according to the second embodiment. FIG. 8 is a flowchart showing the print processing of e-mail data in IFAX according to the second embodiment. FIG. 9 is a flowchart showing text processing in IFAX according to the second embodiment.

The following will explain a case in which a character code (hereinafter insert portion), which is inserted between a pair of codes, "/*" and "*/" in the text part, is not printed.

When e-mail is received (ST801), the data pattern analyzing section 42 analyzes the header portion 51 (ST802) to determine whether or not received e-mail is the multipart structure (ST803).

Here, if e-mail is the multipart structure, the data pattern analyzing section 42 analyzes the subheader 54 of the first part (ST804). The data pattern analyzing section 42 determines whether or not the first part is the text part based on the analytical result (ST805). Since the first part is text part 56 in e-mail shown in FIG. 5, the operation goes to ST806, and the text processing section 71 provides text processing shown in FIG. 9 to the text part 56.

In the text processing, the text processing section 71 first sets a flag to zero (ST901). Next, the text processing section 71 reads the text code from the mail reception memory area 41 in order of the top one by one up to the number of units (two in this case) (ST902). Then, the text processing section 71 determines whether or not the read text code is the end of text code. More specifically, if e-mail is the multipart, the boundary line is determined as an end of text code. If not, only the line including only a period, which is always added to the end of the mail massage, is determined as an end of text code.

If the text code is not the end, it is determined whether or not the read text code is the code "/*" of the top portion (ST904). If it is not "/*", it is determined whether or the read text code is the code "*/" of the end portion (ST905). In the case of the general text code, since the text code does not correspond to either of ST904 and ST905, the operation goes back to ST902, and a next text code is read from one memory, and the determination is performed in ST904 and ST905. The steps ST902 through ST905 are repeated, and this allows the text part 56 to be scanned until the code "/*" is found out.

If the code "/*" is found out by scanning the text part 56, that is, the text code read in ST904 is "/*", it is determined whether or not the flag is 1 (ST906). Since the flag is normally zero, the flag is set to 1 (ST907). Next, the position of the read text code is stored in a memory start position address as a start position P (ST908), and the operation goes back to ST902.

Thereafter, the text part 56 is scanned to find out the code "/*" (namely, in the case where the text code read in ST905 is "*/").

In the case where the text code read in ST905 is "*/", it is determined whether or not the flag is 1 (ST909). In the normal case, the flag is 1 since this is after "/*" is previously found out. Next, the flag is returned to zero (ST910), and then the positions, which are from the start position P stored in the start position address in ST908 to the position of the text code currently read, are determined as insert portions, and these insert portions are replaced with a blank code (ST911). Thereafter, the operation goes back to ST902, and the scanning of text part 56 is continued up to the end of text code.

The determination whether or not the flag is 1 in ST906 and ST909 is carried out to prevent an unintended code from being replaced with a blank code when "/*" and "*/" are included between the pair of specific codes "/*" and "*/" as a common code which is desirably printed.

After the text processing is thus ended, the text part 56 is printed (ST807).

Thereafter, the data pattern analyzing section 42 determines whether or not there is a part, which follows the currently analyzed part (ST808). In this example, since there is an image part 58, which follows the text part 56, the operation goes back to ST804. The data pattern analyzing section 42 analyzes the subheader 55 of image part 58 to determine whether or not it is the text part (ST805) Since this part is image part 58, the image part 58 is normally printed in ST807. Thereafter, since e-mail shown in FIG. 5 has no part following the image part 58 in ST808, processing is ended.

While, if e-mail shown in FIG. 5 is not the multipart structure in ST803, e-mail is normally printed in ST808.

As explained above, according to IFAX of the second embodiment, when e-mail is received, the text part 56 of e-mail is analyzed and the insert portion inserted between the pair of predetermined codes is replaced with the blank code. As a result, even if text part 56 is printed by the printer later, the insert portion may not be printed. Therefore, in a case where a sender has information which is undesirably shown to a recipient, when generating e-mail using PC, such information is written to the text part 56 of e-mail as an insert portion. As a result, the sender can view the insert portion using the file copy but the recipient cannot view the insert portion.

As a more specific form using the above, there is a case in which a serial number or a message such as "importance" is included in the text part 56 of e-mail when PC sends image information to IFAX using e-mail. In this case, by writing the serial number to the text part 56 as an insert portion, the sender can manage e-mail transmitted using the serial number or the message, while the serial number or the message is not printed on the recipient side, so that there is no fear that unnecessary or inconvenient information will be known to the recipient.

Moreover, there is a case in which a specific command is embedded in the text part 56 of e-mail, and the embedded command is recognized by IFAX 1, and processing, which corresponds to the command, is performed. In this case, by writing the command to the text part 56 as an insert portion, IFAX 1 may not print the command.

In the above-explained second embodiment, the insert portion is placed with the blank code. However, such an insert portion may be deleted, or replaced with other unprintable code such as a tab.

The specific codes are not limited to those described in the second embodiment. For example, a symbol such as "#" and "//" may be used as a top portion and the end portion may be used as a line feed. In this case, as in a comment text used in a program source, a logical row, which is started with these specific codes, is replaced with a blank code, and this replacement makes it to prevent the logical row from being printed.

In many cases, the signature of e-mail is enclosed with codes such as "#", "-", "*." The area enclosed with such specific codes is replayed with a blank code, and this replacement makes it possible to prevent the signature from being printed.

The above first and second embodiments explained the case in which the text part was printed by the printer. The present invention, however, is not limited to this case. The preset invention can be widely applied to the output of e-mail. For example, the present invention can be applied to a case in which the text part of e-mail is converted to facsimile image data to be transmitted to the other facsimile apparatus by the facsimile procedure when the text part of e-mail is displayed on the display device.

For example, as shown in FIG. 1, in a case where IFAX 1 on the recipient side is used as a gateway for LAN 2 and PSTN 12 to transmit e-mail from PC 4 to PC in own company and client's G3 facsimiles 11 and 12, the invention relating to the second embodiment can be applied. At this time, a certain message is inserted between a pair of codes when e-mail is generated by sender PC. This e-mail is transmitted to PC in own company and client's G3 facsimiles. The user of PC in own company can directly view the message included in the text part. However, the recipients of G3 facsimiles 11 and 12 cannot view the message since IFAX 1 replaces the message with the blank code and converts e-mail data to a facsimile image to be transmitted to G3 facsimiles 11 and 12. Thus, according to the present invention, it is possible to selectively transmit the message to only a specific communication partner.

As explained above, according to the present invention, the content of the text part of e-mail is analyzed, and whether or not the output of text part is performed is determined based on the analytical result. Therefore, when the content to be output is not included in the text part, the output of text part is not carried out. This makes it possible to prevent a useless output, and to reduce processing time and consumption power.

Moreover, according to the present invention, the text part is output after removing the character string inserted between the pair of fixed codes in the text part of e-mail. This makes it possible to prevent unnecessary or inconvenient information from being output on the recipient side.

The present invention is not limited to the above described embodiments, and various variations and modifications may be possible without departing from the scope of the present invention.

This application is based on the Japanese Patent Application No. HEI11-368837 filed on Dec. 27, 1999, entire content of which is expressly incorporated by reference herein.

What is claimed is:

1. An Internet facsimile apparatus, comprising:
an interface configured to receive e-mail;
a printer configured to print the e-mail; and
a controller configured to:
   determine whether the received e-mail includes a text part when it is determined that the received e-mail comprises a multipart structure; and
   determine whether the text part includes only a predetermined code, the received e-mail being printed without printing a text part page when it is determined that the text part includes only the predetermined code.

2. The Internet facsimile apparatus according to claim 1, wherein the predetermined code comprises a code representing a space.

3. The Internet facsimile apparatus according to claim 1, wherein the predetermined code comprises a code representing a tab.

4. The Internet facsimile apparatus according to claim 1, wherein the predetermined code comprises a code representing a line feed.

5. An Internet facsimile apparatus, comprising:
an interface configured to receive e-mail;
a printer configured to print the e-mail; and
a controller configured to:
   determine whether the received e-mail includes a text part when it is determined that the received e-mail comprises a multipart structure;
   determine whether the text part includes only a predetermined code; and
   determine whether image data is attached to the received e-mail, the image data being printed without printing a text part page when it is determined that the text part includes only the predetermined code.

6. The Internet facsimile apparatus according to claim 5, wherein the predetermined code comprises a code representing a space.

7. The Internet facsimile apparatus according to claim 5, wherein the predetermined code comprises a code representing a tab.

8. The Internet facsimile apparatus according to claim 5, wherein the predetermined code comprises a code representing a line feed.

9. An e-mail receiving method, comprising:

receiving e-mail;

determining whether the received e-mail includes a text part when it is determined that the received e-mail comprises a multipart structure; and determining whether the text part includes only a predetermined code, the received e-mail being printed without printing a text part page when it is determined that the text part includes only the predetermined code.

10. An e-mail receiving method, comprising:

receiving e-mail;

determining whether the received e-mail includes a text part when it is determined that the received e-mail comprises a multipart structure;

determining whether the text part includes only a predetermined code; and determine whether image data is attached to the received e-mail, the image data being printed without printing a text part page when it is determined that the text part includes only the predetermined code.

* * * * *